Oct. 10, 1967     R. J. CARMODY     3,346,442
HONEYCOMB PANEL AND METHOD OF MAKING SAME
Filed Dec. 4, 1963     4 Sheets-Sheet 1

*INVENTOR.*
ROBERT J. CARMODY
BY
ATTORNEYS

Oct. 10, 1967      R. J. CARMODY      3,346,442
HONEYCOMB PANEL AND METHOD OF MAKING SAME
Filed Dec. 4, 1963                          4 Sheets-Sheet 2

INVENTOR.
ROBERT J. CARMODY
BY
ATTORNEYS

*INVENTOR.*
ROBERT J. CARMODY

*ATTORNEYS*

Oct. 10, 1967  R. J. CARMODY  3,346,442
HONEYCOMB PANEL AND METHOD OF MAKING SAME
Filed Dec. 4, 1963  4 Sheets-Sheet 4

*INVENTOR.*
ROBERT J. CARMODY
BY
ATTORNEYS

United States Patent Office 3,346,442
Patented Oct. 10, 1967

3,346,442
HONEYCOMB PANEL AND METHOD OF
MAKING SAME
Robert J. Carmody, 501 Edgemont Drive,
Huntsville, Ala. 35811
Filed Dec. 4, 1963, Ser. No. 328,140
8 Claims. (Cl. 161—68)

The invention described herein may be manufactured and used by or for the Government of the United States of America for governmental purposes without the payment of any royalties thereon or therefor.

This invention relates to the joining or securing together of two or more members, and more particularly to the bonding of one structure to another by means of a thermosetting film adhesive having an electrical heat producing means incorporated therein or secured thereto.

The desirability and usefulness of thermosetting film adhesives for a variety of functions has long been known. However, the relatively recent advent of extremely large aircraft and rockets, which must of necessity be made as strong and yet as light as possible, has resulted in still another use for thermosetting film adhesives being found. This use stems from the desirabilty of utilizing structural members constructed of metal outer protective support plates or sheets between which is sandwiched a metallic structure consisting of a plurality of very thin walled metal strips joined and folded in such a manner as to form an open-work grid that resembles and is therefore termed a "honeycomb" core. In forming panels of this type it has been found that a thermosetting film can be used to great advantage for securing the outer plates to the honeycomb core. This type of panel has the advantage of being very light in weight and yet extremely strong. As mentioned hereinabove both of these attributes are of great importance in the aerospace field.

The prior accepted manner of securing metallic outer plates to a honeycomb core by means of a thermosetting film, required that the uncured member be placed under a source of uniform pressure and heat. This permitted the thermosetting film to cure thus bonding the outer plates to the honeycomb core.

Although this prior method of fabricating panels was reasonably satisfactory it nevertheless had certain drawbacks which severely restricted and even prohibited its use in certain instances. Among the most notable of these restrictions is the requirement that an oven autoclave, press or the like is normally required for producing the desired heating of the laminated panel. In those instances where a large element such as, for example, a booster rocket bulkhead is to be constructed of honeycomb panels, the conventional methods of curing the panels become impractical. This is true since an oven or like apparatus of the size required is extremely expensive to produce, requires considerable lead-time to construct, and is practically useless for any other purpose thus prohibiting its use in a "one-shot" or feasibility test.

Furthermore, the above mentioned method and apparatus heretofore used for curing a panel having a thermosetting film many times failed to produce a satisfactory bond thereby reducing the reliability of the panel and increasing its unit cost. This is due to the inherent disadvantage of the panel being heated from the outer surface inward rather than in the reverse direction. As the external source of heat from the oven strikes the outer surface of the plate members they are gradually heated thereby causing the thermosetting film to be heated. Due to variations in the thickness and the presence of air pockets or impurities in the outer sheets, the heat transfer through the sheets tends to be uneven thus resulting in an irregular bonding of the thermosetting film.

The present invention accordingly, consists in the method and apparatus for joining a plurality of elements using thermosetting film adhesive and applying heat directly to the film without first being conducted through the elements. This is accomplished by placing electrically conductive heat producing means in direct contact with the film. In one embodiment heating wires are embedded in the film while in a modified embodiment one or more of the elements to be joined are heated by passing an electric current therethrough. In still another embodiment, one of the elements to be joined is heated by passing an electric current through resistance heating wires embedded in but electrically insulated from that element.

In order to hold the elements being bonded in position, any suitable method such as the use of clamps or weights may be used. However, to obtain a uniform pressure and hence a uniform bond with the least amount of effort and equipment, it is preferred that the elements being joined be placed in an airtight, evacuated space. Such a space may be easily formed by utilizing a flexible sheet of material impervious to air and sealed about the elements. An example of such a material is a plastic sheet sealed along the element being cured by a tape band, or other suitable element. The plastic sheet can now be evacuated and the elements thus held uniformly together under any desirable pressure up to and including atmospheric pressure.

Accordingly, the primary object of this invention is to provide a method and device for securing members together by utilizing a thermosetting adhesive film having a heat producing means embedded therein or secured thereto.

Another object of this invention is to provide a method for bonding a honeycomb core to support sheets or plates by means of thermosetting adhesive film cured by direct contact heating means thereby eliminating the use of expensive pressure and heat applying apparatus.

A further object of this invention is to secure support plates to a honeycomb core by the use of thermosetting adhesive film combined with direct contact heating and vacuum means to affect a uniform bond between the several elements.

These and other objects and advantages of this invention wil be more apparent upon reference to the following specification, appended claims and drawing wherein:

In order to better understand the construction and use of this novel thermosetting adhesive film it will be described in relation to the bonding of support plates to a honeycomb core or to the bonding of a bulkhead within a rocket fuel tank. It is to be understood, however, that various other uses may be found for this novel film. For example, such film could be used in joining wing sections in aircraft or body panels in trailer trucks. Other uses will be readily apparent to those skilled in the art.

Figure 1:
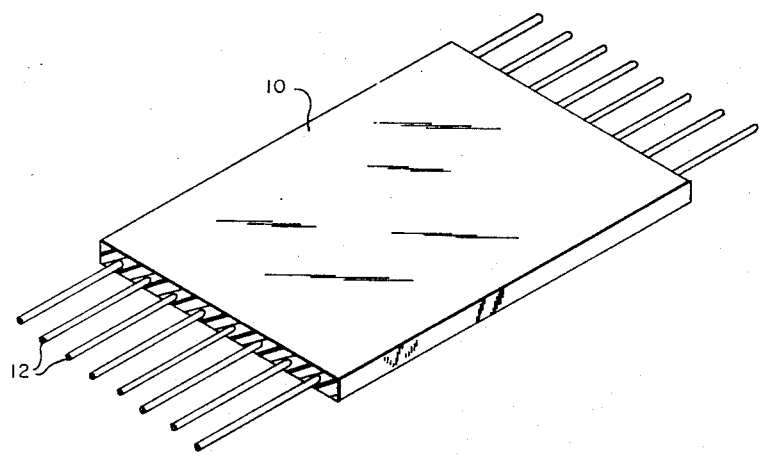
FIGURE 1 is a perspective view showing a section of thermosetting adhesive film having heating elements embedded therein.
Figure 2:
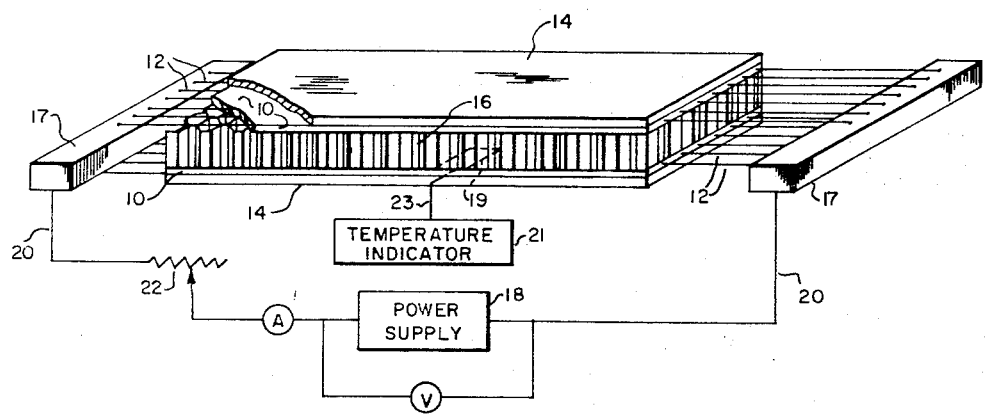
FIGURE 2 is a side elevation which shows the use of thermosetting adhesive film to secure support plates to a honeycomb core and a power supply for applying heat producing energy to the heating elements.
Figure 3:
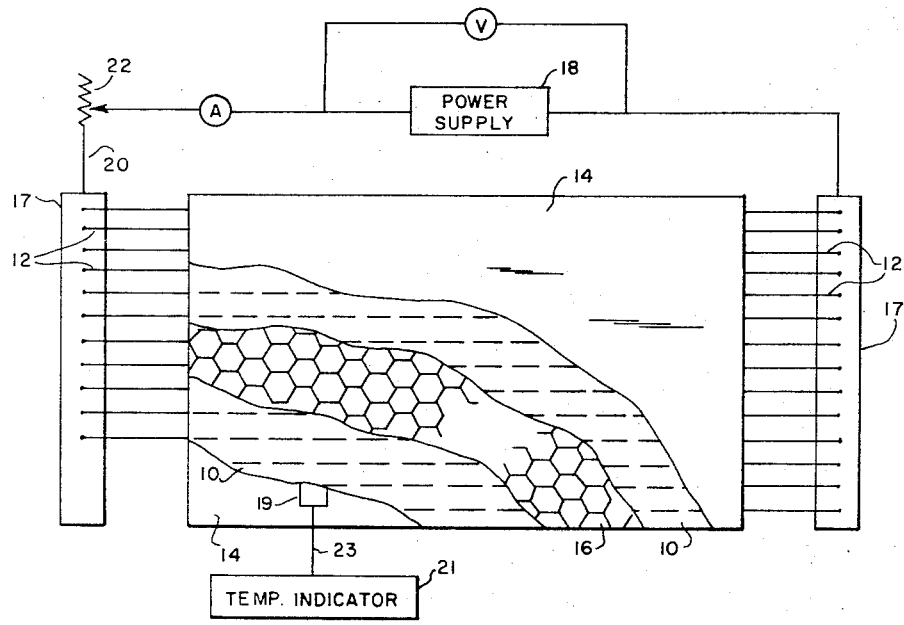
FIGURE 3 is a top view of the panel of FIGURE 2 partly broken away to show its various components.

With continued reference to the accompanying figures wherein like numerals designate similar parts throughout the various views, and with initial attention directed to FIGURE 1, reference numeral 10 designates a thermosetting adhesive film or bonding member having electrically conductive heating elements such as granular carbon or resistance wires embedded therein. Any thermosetting adhesive film either supported or unsupported may be utilized as the material of element 10. Generally, commercially available films are sold in roles of specific length and width. However, any adhesive film may be chosen as long as it has the property of curing to a set when its temperature is raised to a specified level and held there for a particular period of time.

The heating elements 12 may be of any suitable size and constructed of any suitable material to provide a resistance along their length and thereby produce heat when an electric current is passed therethrough. For example, nichrome wires having a diameter of from 5 to 10 thousandths of an inch and placed 1/8" apart in order to produce an even distribution of heat within the film have been found to be satisfactory.

In a bonding operation the adhesive film of FIGURE 1 is used in the following manner. The members to be joined are cleaned to assure a good bond and a priming material is applied if such is recommended by the film manufacturer. The adhesive film is then placed between the members, the direct contact heating means is connected to a power supply characterized by high amperage and low voltage, and pressure is applied so as to force each member into firm contact with the film. At this point heat producing energy from the power supply is applied to the heating means and the temperature of the film begins to rise. During the period of rise, the adhesive film softens and tends to flow over the surfaces to be joined. At a specific temperature the film begins to cure and harden. After holding the film temperature constant at the curing level for a period of time, determined by the type of film being used, the film hardens to a set and the members are securely joined.

The curing time, temperature, rate of temperature rise and pressure applied vary with the film material and the bonding properties desired. However, a typical cycle for adhesive film would be a 30 minute heat up to 340° degrees F. followed by a cure of 60 minutes at 340° F. A pressure of from 3 to 14 pounds per square inch should be maintained over the laminated layers during the heat up and curing periods. If the temperature is held at a higher level the cure time may be correspondingly reduced and still maintain the same ultimate bonding strength.

In FIGURES 2 to 6 the bonding of outer support plates to a honeycomb core 16 by the use of adhesive film is illustrated. In the embodiment illustrated in FIGURES 2 and 3, a section of film having heating elements 12 embedded therein is placed on the faces of the core 16 to which plates 14 are to be bonded. The heating element wires 12 are exposed and connected to bus bars 17 which are electrically connected to a power supply 18 through lead wires 20 and a variable resistor 22. A thermocouple 19 is placed in contact with film 10 and connected to a temperature indicator 21 through the thermocouple lead 23. The outer support plates 14 are then placed in face to face contact with the films 10. Bonding is accomplished by applying pressure and heat in the manner described above in relation to the description of the embodiment of FIGURE 1. Control of the film temperature is accomplished by adjusting variable resistor 22 to restrict or increase the current flow through heating elements 12 so as to obtain the desired reading on the temperature indicator 21. If desired a plurality of thermocouples 19 may be placed in various locations along both the upper and lower adhesive films. Such would increase the accuracy of indication of film temperature.

Figure 4:
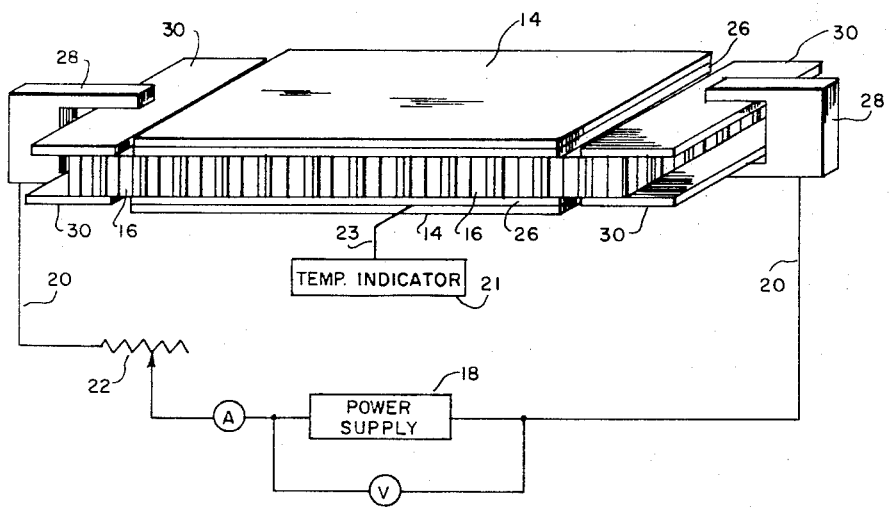
FIGURE 4 is a perspective view of another system for securing support plates to a honeycomb core by the use of thermosetting adhesive film wherein the curing heat is produced by passing an electrical current through the honeycomb core itself.

In the embodiment of FIGURE 4, the honeycomb core 16 itself is used as a resistance heating element to raise the temperature of adhesive films 26. Thus, bus bars 30 are clamped to opposed faces and on opposite sides and in the ribbon direction of the core by clamp means 28. These members serve not only to secure the bus bars to the core but also provide a terminal for leads 20 which are connected to a low voltage, high amperage electrical power supply 18. As in the embodiment illustrated in FIGURES 2 and 3, the power supply 18 is controlled by a variable resistor 22.

The mode of operation of this embodiment is as previously described in that pressure and heat are applied to effect a bonding. However, the flow of current is from the controllable power supply 18 through leads 20 to clamps 28, from the clamps to the bus bars 30, through core 16 and back to the power supply. Since core 16 is used as the heating element, more current is required to produce sufficient heat to raise the film temperature due to the fact that the conductor area is relatively large.

Figure 5:
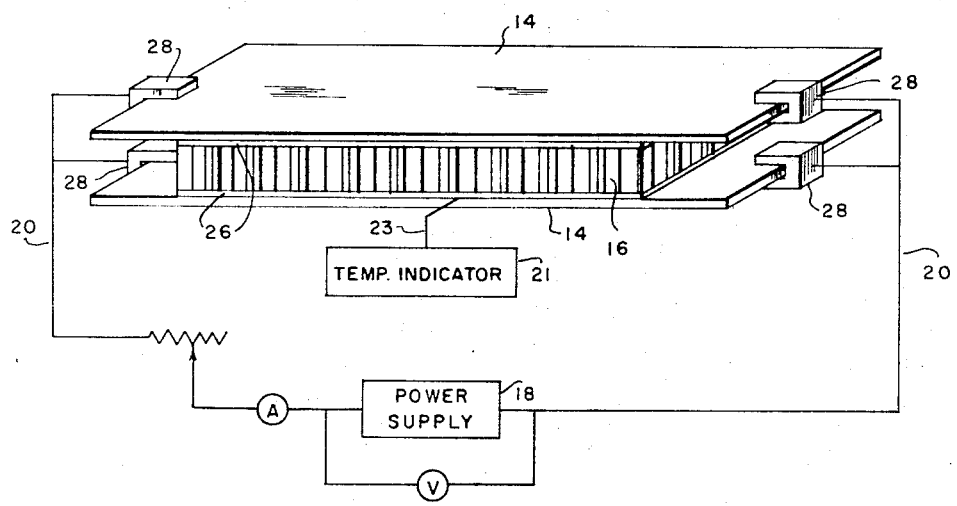
FIGURE 5 is a perspective view showing a method for bonding support plates to a honeycomb core by the use of adhesive films wherein the curing heat is produced by passing an electric current through the support plates.

The curing heat may also be produced by passing an electrical current through the support plates 14 as illustrated in FIGURE 5. In this instance the current flow is from the controllable power supply 18 through leads 20 to clamping elements 28, through the support plates 14 and back to the power supply. It is obvious that while it is preferred that both support plates be used as heating elements, one plate will produce sufficient heat to cure both films 26 due to heat being conducted through the honeycomb core 16 to the other film.

Figure 6:
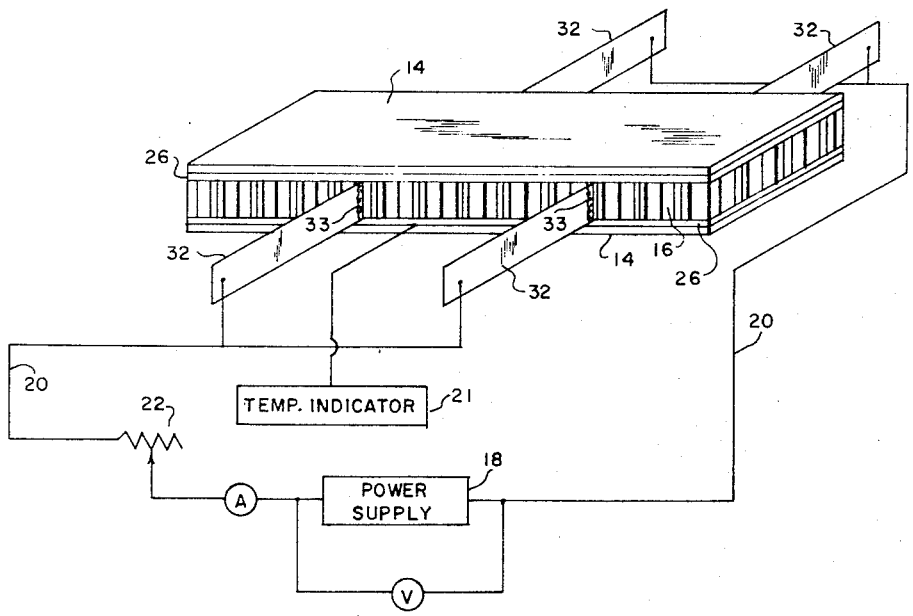
FIGURE 6 is a perspective view showing still another method for bonding support plates to a honeycomb core by adhesive films wherein curing heat is produced by heating elements embedded in the honeycomb.

In the embodiment of FIGURE 6, the electric current is passed through resistance heater elements 32 embedded in the core 16 and surrounded by electrically insulative adhesive material 33. When electric current from the power supply 18 is passed through the strips 32, the temperature of the core 16 and the adhesive film 26 rises. The core 16 may be constructed of nonconductive material in which case all the heat is emitted by strips 32. Control of the degree of rise is affected by means of variable resistor 22 and the temperature indicator 21.

Except for the embodiment of FIGURE 4 the materials utilized for the honeycomb core 16 and the protective support plates 14 may be chosen from a wide variety of either conductive or nonconductive substances such as metals, paper, synthetic resins, etc. as long as they possess the required strength and other necessary properties. Of course where the core or support plates are used as the heating element as in the embodiments of FIGURES 4 and 5, these elements must be constructed of a conductive material such as metal or a plastic resin containing a carbon or a graphite fiber.

Control of the degree of film temperature rise may be effected by the use of a thermostat rather than the manual control illustrated. In such a device a sensing element transmits film temperature to a control element which regulates the amount of heat producing energy distributed from the power supply.

Figure 7:
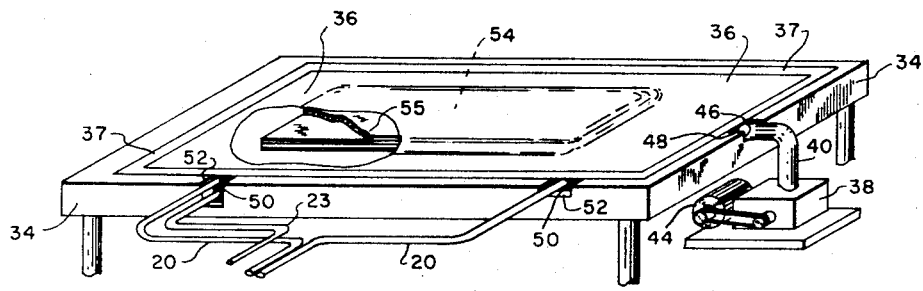
FIGURE 7 illustrates in a perspective view the use of a flexible sheet of material air tightly sealed about a work-piece and upon which a vacuum is being drawn.
Figure 8:
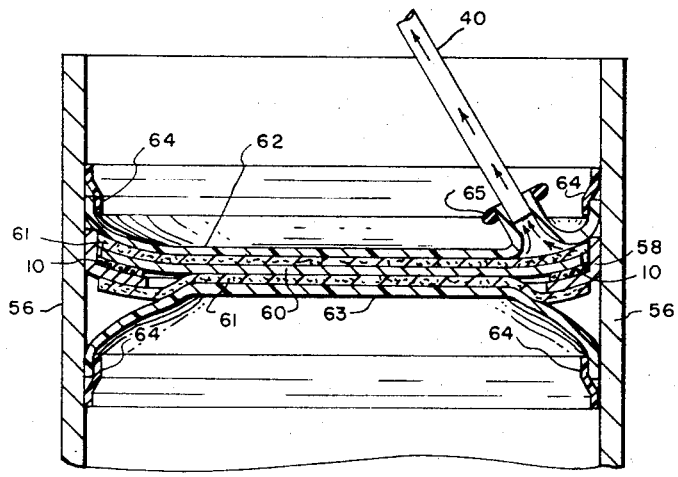
FIGURE 8 is a side elevation showing another use for the thermosetting adhesive film wherein a bulkhead is bonded within a booster rocket fuel tank.

FIGURES 7 and 8 illustrate two methods of utilizing a vacuum to produce the desired bonding pressure. In FIGURE 7 a flexible sheet 36, preferably of polyvinyl alcohol plastic material, is sealed about work piece 54 and to support surface 34 by a tape 37 or other suitable sealing means. The support surface includes slots 46 and 52 which lead from the edge of the surface 34 to a point under the sheet 36. Electrical leads 20 are inserted in slots 52 along with the thermocouple lead 23 while slot 46 accommodates an exhaust hose 40. Seals 48 and 50 are placed in the slots around the hose and leads respectively to prevent loss of vacuum. Hose 40 is connected to a vacuum pump 38 which is driven by motor 44. When a vacuum is drawn between sheet 36 and support surfaces 34, the elements of work piece 54 are forced into firm contact by atmospheric pressure. A layer of insulating material 55 may be placed on the outer surfaces of work piece 54 to minimize heat losses and, due to its porosity, cause the vacuum to be more uniform beneath the sheet 36.

In the embodiment of FIGURE 8 a bulkhead 60 of fiberglass, metal or honeycomb panel is secured within a tank 56 on a circular angle ring 58. In the assembly operation, a section of thermosetting adhesive film 10 having heating elements embedded therein such as that shown in FIGURE 1, is placed between the angle ring and the bulkhead. A porous bleeder cloth 61 is positioned across one side of the bulkhead 60. A flexible sheet 62 is placed above the cloth and airtightly sealed to the tank 56 by means of zinc chromate tape 64. A second piece of porous bleeder cloth 61 is positioned on the opposite side of the bulkhead 60 with flexible sheet 63 placed below the second cloth and also airtightly sealed to the tank by zinc chromate tape 64. Exhaust hose 40 is inserted through an aperture in sheet 62 and secured by a sealing grommet 65. The enclosed space between sheets 62 and 63 is then evacuated by attaching the hose 40 to a vacuum pump such as that shown in FIGURE 7. Due to the porosity of cloth 61, a uniform vacuum is produced throughout the enclosed space and atmospheric pressure produces a force tending to push the bulkhead into firm contact with the adhesive film 10 which is in turn pushed tightly against angle ring 58. Electric current is then applied to the heating elements within the film 10 and a curing cycle as previously described is begun. When the cure has been completed and the vacuum released, the bulkhead 60 and angle ring 58 remain firmly bonded together.

It will be apparent from the foregoing that means for joining two or more members in a simple and inexpensive manner has been disclosed. No expensive heating ovens, autoclaves, presses or the like are required. All that is needed is a source of electric current and means for applying pressure. The latter means may be either mere weights or clamps but is preferably an evacuated space of the nature described with reference to FIGURES 7 and 8. Despite its simplicity, the process is extremely flexible and may be used on a great number of shapes and sizes of elements either in a factory, repair shop, or in the field. Such has not heretofore been practical in the use of thermosetting adhesive films.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within this meaning and range of equivalency of the claims are therefore intended to be embraced therein.

What is claimed and desired to be secured by United States Letters Patent is:

1. A honeycomb panel comprising:
   (a) a structural core element of thin wall material formed into a honeycomb;
   (b) a thermosetting film adhesive disposed on at least one face of said honeycomb core;
   (c) at least one outer structural plate element disposed on a side of said adhesive film remote from said honeycomb core; and
   (d) at least one of said structural elements being fabricated of an electrically conductive metal offering sufficient resistance to the flow of electric current so that heat is produced over the entire surface area of the said structural element when electric current is passed therethrough, thus curing the film adhesive and bonding the structural elements together.

2. The honeycomb panel of claim 1 wherein said electrically conductive structural element is said honeycomb core.

3. The honeycomb panel of claim 1 wherein said electrically conductive structural element is said outer plate.

4. A honeycomb panel comprising:
   (a) a structural core element of thin wall material formed into a honeycomb;
   (b) a thermosetting film adhesive disposed on at least one face of said honeycomb core;
   (c) at least one outer structural plate element disposed on a side of said adhesive film remote from said honeycomb core; and
   (d) said honeycomb core further comprising an electrically conductive resistance heating element embedded within said core, for heating the entire surface area of said core, when electric current is passed through said heating element, thus curing the film adhesive and bonding the structural elements together.

5. The method of making a laminated bonded panel comprising the steps of:
   (a) fabricating a structural honeycomb core and two outer structural coverings of an electrically conductive metal offering sufficient resistance to the flow of electric current so that heat is produced when electric current is passed therethrough;
   (b) placing thermosetting film adhesives in overlying relationship with each of two sides of the structural honeycomb core;
   (c) abutting an outer structural covering against the side of each of the said films remote from the structural core so that the core and the coverings are spaced from one another;
   (d) passing an electric current through at least one of the said structural elements to heat the structural element over its entire surface area and thereby cause the film adhesives to set and to bond the structural core to the outer structural coverings.

6. The method of making a laminated bonded panel according to claim 1 including the further steps of:
   (a) placing the laminated panel within an air tight compartment having at least one flexible wall so that one of the outer structural coverings abuts the flexible wall and the remaining outer structural covering rests on a fixed support surface, and
   (b) evacuating said compartment, thereby causing both of the outer structural coverings to be pushed inward against the film adhesives as the flexible wall is pressed in by atmospheric pressure.

7. The method of making a laminated bonded panel comprising the steps of:
   (a) embedding a heat-producing resistance element within a structural honeycomb core;
   (b) placing thermosetting film adhesives in overlying relationship with each of two sides of the structural core;
   (c) abutting an outer structural covering against the side of each of the films remote from the structural core so that the core and the coverings are spaced from one another; and
   (d) passing an electric current through the resistance element embedded in the core, for heating the entire surface area of the core and thereby causing the film adhesives to set.

8. The method of making a laminated bonded panel according to claim 7 including the further steps of:
   (a) placing the laminated panel within an air tight compartment having at least one flexible wall so that one of the outer structural coverings abuts the flexible wall and the remaining outer structural covering rests on a fixed support surface, and (b) evacuating said compartment, thereby causing both of the outer structural coverings to be pushed inward against the film adhesives as the flexible wall is pressed in by atmospheric pressure.

References Cited

UNITED STATES PATENTS

| | | | |
|---|---|---|---|
| 2,662,045 | 12/1953 | Baggott | 156—275 |
| 2,715,598 | 8/1955 | Rees et al. | 156—275 |
| 2,742,390 | 4/1956 | Beck | 156—275 |
| 2,814,717 | 11/1957 | Hardesty | 219—107 |
| 2,902,589 | 9/1959 | Wirta | 219—107 |
| 3,067,507 | 12/1962 | Titus | 156—382 XR |
| 3,097,982 | 7/1963 | Stoner | 156—211 |
| 3,239,403 | 3/1966 | Williams et al. | 156—275 |

EARL M. BERGERT, *Primary Examiner.*

H. F. EPSTEIN, *Assistant Examiner.*